Sept. 27, 1960 N. D. COGGESHALL Re. 24,876
MULTIPLE COLUMN CHROMATOGRAPHIC APPARATUS
Original Filed Dec. 16, 1955
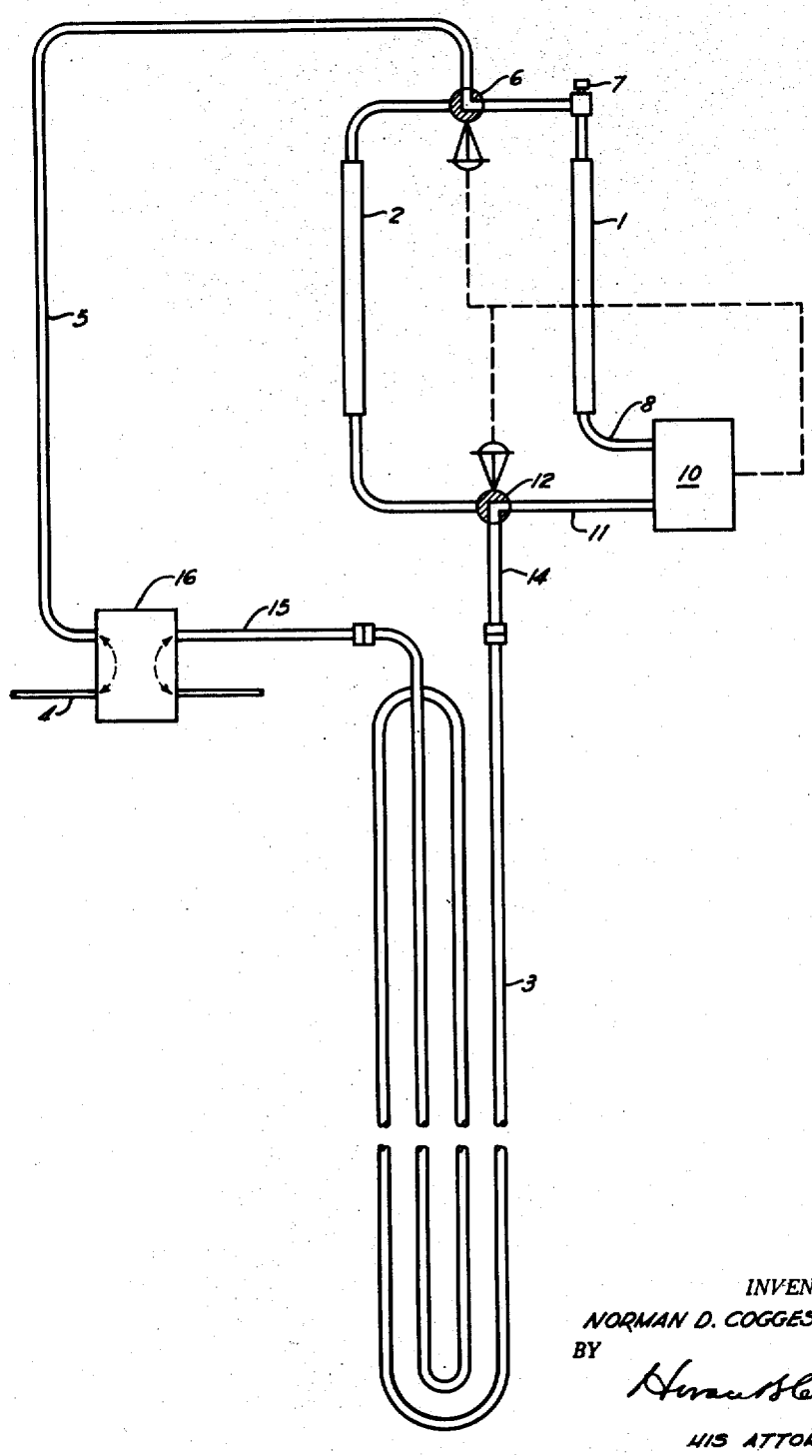
INVENTOR.
NORMAN D. COGGESHALL
BY
Horace Hooke
HIS ATTORNEY United States Patent Office Re. 24,876
Reissued Sept. 27, 1960

24,876

MULTIPLE COLUMN CHROMATOGRAPHIC APPARATUS

Norman D. Coggeshall, Penn Hills, Pa., assignor to Gulf Research & Developing Company, Pittsburgh, Pa., a corporation of Delaware Original No. 2,868,011, dated Jan. 13, 1959, Ser. No. 553,571, Dec. 16, 1955. Application for reissue Dec. 28, 1959, Ser. No. 862,434

4 Claims. (Cl. 73—23)

Matter enclosed in heavy brackets [ ] appears in the original patent but forms no part of this reissue specification; matter printed in italics indicates the additions made by reissue.

This invention relates to apparatus for separating fluid mixtures and more particularly to multiple-column chromatographic apparatus whereby a fluid mixture is fractionated by partition chromatography in order to identify the components of the mixture.

It is known that the principles of partition chromatography can be applied to the separation and analysis of multi-component fluid mixtures (see, for example, the article by N. H. Ray, Journal of Applied Chemistry, vol. 4, page 21, February 1954). In a gas-liquid partition chromatography a fluid mixture is separated by selectively partitioning its components between a stationary liquid phase and moving gas phase. The stationary liquid phase is formed as a coating of a non-volatile solvent on a column of granular solid material and the gas phase is formed by flowing a carrier gas such as helium or hydrogen through the column. The manner in which the separation of a mixture is accomplished in partition chromatography can be explained by considering first what happens when a single pure compound is introduced to one end of the partition chromatography column. The compound will immediately partition itself into two portions, one of which will be in solution in the stationary liquid phase and the other of which will be in the gas phase. When the flow of carrier gas is initiated it moves that portion in the gase phase forward. As this occurs there is a continual partitioning between the material in the gas phase and that in the liquid phase. As a result the pure material moves along the column but at a slower speed than the carrier gas. The rate of movement is dependent upon the partition coefficient. Different materials have different partition coefficients and hence move at different speeds. This is the basis for the separation by this technique. A complex mixture of materials injected into the partition chromatography column will separate into components moving at different speeds so that, if the column is long enough the components will emerge one by one from the column, usually in the order of boiling points for a homologous series.

In analytical methods using the gas-liquid partition chromatography technique the components of the mixture which emerge successively from the partition column are identified in various suitable ways. For example the effluent from the column is passed through a thermal conductivity cell connected with a recording potentiometer. The plot of potentiometer deflection against time provides a quantitative and qualitative analysis of the components of the mixture.

Although the partition chromatography method of analysis has proved to be valuable for many uses, it does have disadvantages in certain separations. Thus, if it is desired to analyze or to separate precisely only those components of a multi-component mixture which are readily removable from a partition chromatography column, a considerable length of time may be required to remove the remaining components of the mixture from the column in order to restore it to its original condition for the next cycle of analysis or separation. For example, if it is desired to analyze precisely only the $C_4$–$C_6$ hydrocarbons of a gasoline sample, these hydrocarbons can be carried through a long partition chromatography column in a period of an hour or less. However, to remove the rest of the gasoline range hydrocarbons could require a period of many hours, for example, 20 hours or more. If a crude oil is being analyzed for light hydrocarbons, these components will emerge from the column in a reasonably short time but it may require many days to remove the rest of the crude oil. As a practical matter it may be impossible to remove all of the heavy components of the crude with carrier gas alone. Therefore, if a column used for such separations is used in subsequent runs the heavier components remaining in the column from previous runs will continue to emerge slowly from the column and will make it difficult or impossible to analyze accurately the light components of the subsequent runs.

The apparatus of the present invention enables avoidance of the problem referred to above and includes a principal chromatographic partition column that can be used for a large number of separations without becoming fouled by heavy materials which would pass through the same slowly.

The apparatus of the invention in general comprises a first partition chromatography column, a parallel by-pass column and a principal chromatographic column. A line is provided for introducing carrier gas into the system and this line has an automatically controlled valve for directing the flow of carrier gas either to the first column or to the by-pass column. The first column is provided with means for introducing feed mixture and a means for withdrawing the effluent from the column for delivery to the principal chromatographic column. In the preferred embodiment the inlet line to the principal column is provided with a valve automatically operable in coordination with the first mentioned valve for receiving flow from either the first column or from the by-pass column. The effluent line from the first column passes through gas analysis means adapted to operate the valves to switch the flow of carrier gas from the first column to the by-pass column upon the appearance of predetermined substances in the effluent from the first column. The principal chromatographic column is provided with an effluent line which passes through a thermal conductivity cell.

Further understanding of the invention can be obtained from the drawing, the sole figure of which shows diagrammatically a preferred embodiment of the apparatus used for analyzing fluid mixtures.

The apparatus of the drawing comprises a first partition column 1, a by-pass column 2 and the principal partition chromatographic column 3. Columns 1 and 2 are arranged in parallel flow with respect to each other and in series with the principal column 3. As the drawing shows, the principal column 3 has greater capacity than the first column. In the modification of the drawing it is in the form of a long coiled tube.

Columns 1 and 3 are filled with a granular solid which has a surface coating of a high boiling liquid. Column 2 may be filled with the same permeable solid material or with any other packing that will provide the same flow resistance as the material in column 1. A carrier gas inlet line 4 passes the carrier gas through one of the two gas channels of a thermal conductivity cell 16. The gas then passes by line 5 to a diaphragm-operated valve 6 which is at a bifurcation in line 5. This valve directs the carrier gas either to column 1 or to the by-pass column 2. Column 1 has a feed inlet which, in the apparatus of the drawing, is a serum cap 7 into which a mixture to be analyzed is injected with a hypodermic syringe.

Column 1 has an effluent line 8 for withdrawing the mixture of carrier gas and the lighter components of the feed mixture. In the apparatus shown in the drawing, line 8 passes through a gas analysis means 10. The analyzer 10 can be, for example, a thermal conductivity cell and recording potentiometer. In this case, an operator switches the flow of carrier gas from column 1 to column 2 by operating valves 6 and 12 when the recorder shows that a predetermined component of the feed mixture has emerged from column 1. In another modification of the invention, the analysis means 10 is an analyzing control means such as an infrared absorption spectrometer cell which can identify a particular component of the feed mixture and actuate a valve operating means when such component appears in the effluent from column 1. Line 11 from the gas analysis means passes the effluent of column 1 to valve 12. This is a diaphragm-operated valve for receiving flow from either column 1 or column 2 and directing such flow into line 14 which is the inlet means for the principal column 3.

As I have indicated, both valves 6 and 12 can be automatically operable valves. In the apparatus of the drawing, they are operated to switch the flow of carrier gas from the first column 1 to the by-pass column 2 in response to changes in the effluent from column 1 as detected by the analyzer 10. When a predetermined heavy component of the feed mixture which it is desired to keep out of column 3 appears in the effluent from column 1, the analyzer 10 passes a signal to an actuating means for the air-operated diaphragm valves. Also in accordance with the invention, instead of operating in response to the analyzer 10, valves 6 and 12 can be actuated manually or by a timing device at a predetermined time after introducing the feed mixture. This predetermined time can be at any point between the known time at which the last of the desired light components will be swept from the first column and the known time at which the first of the undesired heavy components will begin to emerge.

Valves 6 and 12 switch the flow of carrier gas from column 1 to column 2. Thereafter, carrier gas alone is passed into colmn 3 and it successively elutes the lighter components of the feed mixture. These materials emerge from column 3 via line 15 and pass through the testing channel of thermal conductivity cell 16. This cell is connected with a recording potentiometer, not shown in the drawing, which continuously plots potentiometer deflections against time. This plot can be used for a qualitative and quantitative analysis of the lighter components of the feed mixture.

Although thermal conductivity cells are well known in the art, a brief description of their operation can be given. The conventional thermal conductivity cell employs a Wheatstone bridge, two arms of which are heated platinum wires. One of the wires extends into a reference region through which a reference gas flows and the other extends into a testing region through which the gas being analyzed flows. In the process and apparatus of the invention the inlet stream of carrier gas flows through the reference region and the effluent stream from the chromatographic column, consisting of carrier gas and the components of the feed mixture that are eluted from the column, flows through the testing region. When a gas is in contact with a heated platinum wire of the cell, the wire is cooled to an extent that depends on the thermal conductivity of the gas, and, when the composition of the gas flowing through the testing region changes, its thermal conductivity changes and the temperature of the platinum wire changes correspondingly. As a result of the temperature change of the wire its electrical resistance changes. The variations in the difference between the resistances of the platinum wires in the testing and reference regions are reflected in the unbalance of the Wheatstone bridge as indicated by a recording potentiometer. The recorded deviations can be related to the composition of the gas being analyzed.

I have mentioned above that in a preferred embodiment of the apparatus the by-pass column is a column packed with granular material in such a manner that its resistance to gas flow is substantially equal to that of the first column. This is important when a thermal conductivity cell is used as the means for analyzing the effluent from the principal column because it insures that the pressure of the carrier gas at the inlet to the principal chromatographic column will not change substantially when the carrier gas flow is switched from the first column to the by-pass column. Thermal conductivity cells are sensitive to changes in flow rates and to obtain uniform results from the cell, the flow rate of carrier gas through the principal column and therefore its pressure at the inlet to the column should be kept substantially constant.

A further understanding of the invention can be obtained from the following illustrative example of the process of the invention.

EXAMPLE

A Kuwait crude oil having an API gravity of 32, a 10 percent boiling point of 280° F. and a 70 percent point of 655° F. is analyzed for light ends in an apparatus as illustrated in the drawing. The purpose is to identify qualitatively and quantitatively the lower molecular weight hydrocarbons in the oil, that is to say, the $C_6$ and lower hydrocarbons. The chromatographic columns are filled with granular kieselguhr. In the principal chromatographic column, column 3 of the drawing, the partitioning liquid which coats the kieselguhr is dioctyl phthalate. In the first column, column 1 in the drawing, the kieselguhr is coated with paraffin wax. The by-pass column 2 is also filled with granular kieselguhr but this body of granular material is not coated with a liquid. However, its resistance to gas flow is substantially equal to that of the body of granular material in column 1. At the start of the process, the carrier gas, helium, is flowed through the first column 1 and the principal column 3 at room temperature. A uniform temperature for the entire apparatus including the chromatographic columns and the detecting means is maintained by the use of a constant temperature air bath. The principal chromatographic column, 3, for this separation is a coiled stainless steel tube 14 feet in length and having an inside diameter of 4.5 mm. The primary column and the by-pass column are similar tubes, each having a length of 3 feet. A charge of the order of 0.08 gram of the crude oil to be analyzed is introduced by a hypodermic syringe into the rubber serum bottle cap which serves as the feed inlet for the first column. In accordance with the principles of partition chromatography, the more volatile components of the crude oil begin to emerge successively from the primary column from whence they pass through a gas analyzing means and then into the principal chromatographic column. The gas analyzer is set to detect the first emergence of hydrocarbons of more than 6 carbon atoms. When the detecting apparatus indicates the first heptanes in the effluent from the primary column, a valve control means automatically operates the diaphragm valves 6 and 12 to switch the flow of carrier gas from the first column to the by-pass column 2. The light constituents of the charge mixture are then successively swept from the principal chromatographic column 3 by the carrier gas. The thermal conductivity cell 16 and its recording potentiometer provide a quantitative and qualitative analysis of the emerging light components of the crude oil charge. The introduction of $C_7$ and heavier hydrocarbons which move very slowly through a partition chromatography column is avoided. The light hydrocarbons are completely removed from the principal column 3 by the carrier gas and the column can then be used for another run. The first column 1 containing the heavy ends of the crude oil is replaced by a freshly prepared first column.

Although I have described the embodiment of my apparatus in which an analyzing control means is used to switch the flow of carrier gas from the first partition column to the by-pass column, the switching of the flow at the proper point can also be accomplished without actually analyzing the effluent from the first column. After experience in analyzing a particular type of mixture, one can determine the time after introduction of the feed mixture at which the flow of carrier gas should be switched. For instance, when a gasoline fraction is analyzed for hydrocarbons in the $C_4$–$C_5$ range, there will be normally a substantial period between the times at which the tail end of the last $C_5$ compound and the head end of the first $C_6$ compound emerge from the first column. These times will be known after experience with the particular type of mixture and therefore at any desired time during the period the flow of carrier gas can be switched from the first column to the by-pass column without the necessity of analyzing the effluent from the first column. The switching of valves at the predetermined time can be done manually or automatically by a timing device which actuates the valve operating means.

I have used a wide boiling range hydrocarbon mixture as an example of a mixture which can be separated or analyzed by the process of the invention. It should be understood, however, that the process can be applied advantageously to the separation or analysis of a great number of mixtures where it is desired to prevent the entry of the more strongly-held components of the mixture into the main chromatographic column.

In the example above I have described the use of the same granular material in the first column and in the principal column. It is within the scope of the invention to use any of the granular materials known in the art for use in partition chromatography. Furthermore, either the same or different solid materials can be used for the first column and the principal column.

As a general rule, the solid materials used for partition chromatography are non-porous, granular materials. Preferably they are not chromatographically active adsorbents, as otherwise the effects of adsorption chromatography and partition chromatography would be superimposed upon each other and this might prevent the obtaining of sharply defined fractions. The partitioning liquid, that is, the high boiling liquid which is coated on the granular material, can be the same in both columns or, advantageously, different liquids can be used. In the latter case a partitioning liquid adapted for the particular separation being carried out in each column can be selected. Samples of suitable partitioning liquids include dioctyl phthalate, dinonyl phthalate, dioctyl sebacate, paraffin wax, silicone fluids, etc.

The carrier fluid in the process of the invention preferably is a gas, although the principle of the invention extends to the use of a liquid carrier fluid, in which case the process would be a liquid-liquid partition chromatography process. A carrier liquid should be immiscible or partially immiscible with the partitioning liquid. Examples of suitable carrier gases include hydrogen, helium, nitrogen, etc. Preferably a low molecular weight carrier gas is used when the detecting means used for the process is a thermal conductivity cell.

In the foregoing description of the invention I have described a thermal conductivity cell with a recording potentiometer as a preferred means for analyzing the effluent from the principal column. However, other known continuous analyzers with similarly high sensitivity can also be used in the process and apparatus of the invention.

In the description above and in the claims I have referred to "heavy" components and "light" components of the feed mixture and have indicated that the process of the invention prevents the fouling of the principal partition column by such heavy components. The terms heavy and light are used for convenience to distinguish between components of a mixture which move slowly through a partition column and those which move more rapidly. In most mixtures, for example, in mixtures of a homologous series of compounds, the light components or lower molecular weight components will pass more rapidly through a partition column than the heavy or higher molecular weight components. This may not be true, however, of some mixtures of compounds of different molecular types. Therefore it should be understood that, as used in this specification, a heavy component of a mixture is one which has a partition coefficient which favors retention of the component in the liquid phase of a partition column and results in slow movement of the component through the column while a light component is one which has a partition coefficient which favors its entry into the moving gas phase and thus results in more rapid movement of the component through the column.

Obviously many modifications and variations of the invention as hereinbefore set forth may be made without departing from the spirit and scope thereof and therefore only such limitations should be imposed as are indicated in the appended claims.

I claim:

1. A partition chromatography apparatus which comprises a first partition column and a parallel by-pass column, means to introduce a carrier gas into said parallel columns, a principal partition column in series with the first column and the by-pass column, means between said first column and said principal column for analyzing the effluent from said first column, valve means responsive to said analyzing means for switching the flow of carrier gas from said first column to said by-pass column on the appearance of a predetermined constituent in the effluent from the first column, means intermediate the valve means and the first column for introducing a fluid mixture to be analyzed, and means for analyzing the effluent from said principal column.

2. An apparatus for analysis of fluid mixtures which comprises a first partition column and, in parallel flow relation therewith, a by-pass column having substantially the same resistance to gas flow as said first column, a principal partition column, a thermal conductivity cell having channels for the flow of gas, a line for receiving a stream of carrier gas from a reference channel of said cell, said line having a bifurcation at the exit end thereof, one fork of which leads to said first column and the other fork of which leads to said by-pass column, a valve at said bifurcation automatically operable for switching the flow of carrier gas from the first column to the by-pass column, means to introduce the fluid mixture to be analyzed into the said one fork, effluent lines from each of said parallel columns, said lines joining to form an inlet line for said principal column, a valve at the juncture of said effluent lines automatically operable in coordination with said first mentioned valve for switching the flow into the principal column from the first column to the by-pass column, an analyzing means in the effluent line from said first column between said column and the second mentioned valve, said analyzing means being operably connected with a valve control means adapted to operate said valves to switch the flow of carrier gas from said first column to said by-pass column when a predetermined substance is identified in the effluent from said first column, and an effluent line from said principal column which leads to a testing channel of said thermal conductivity cell.

3. In partition chromatography apparatus, a first partition column having an inlet and an outlet, a by-pass for the first column having an inlet and an outlet, said by-pass affording substantially the same resistance to the flow of fluids therethrough as the first column, means for selectively directing a carrier fluid into the inlets of the first column and the by-pass, means for introducing a fluid mixture to be analyzed into carrier fluid [selectively] directed to the inlet of the first column, a principal partition column having an inlet and an outlet, means for selectively communicating the inlet of the principal column with the outlets of the first column and the by-pass, and means for analyzing the effluent from the outlet of the principal column.

*4. In partition chromatography apparatus, a first partition column having an inlet and an outlet, a by-pass for the first column having an inlet and an outlet, means for selectively directing a carrier fluid into the inlets of the first column and the by-pass, means for introducing a fluid mixture to be analyzed into carrier fluid directed to the inlet of the first column, a principal partition column having an inlet and an outlet, means for selectively communicating the inlet of the principal column with the outlets of the first column and the by-pass, and means*

*for analyzing the effluent from the outlet of the principal column.*

References Cited in the file of this patent or the original patent

UNITED STATES PATENTS 2,398,818 Turner ---------- Apr. 23, 1946

OTHER REFERENCES

Article: Thermal Conductivity Gauge for Use in Gas Liquid Partition Chromatography, Ambrose et al., in Journal of Scientific Instruments, vol. 32, August 1955.

Gas Chromatography II: N. H. Ray in Journal of Applied Chemistry, vol. 4, February 1954.

Article: Chromatographic Analysis of Hydrocarbon Mixtures by Bradford et al., published in Journal of Institute of Petroleum, vol. 41, 1955, pages 80–87.